(12) United States Patent
Tatsuki et al.

(10) Patent No.: US 6,404,548 B1
(45) Date of Patent: Jun. 11, 2002

(54) REFLECTION TYPE SCREEN FOR PROJECTORS

(75) Inventors: Koji Tatsuki, Kawagoe; Hideo Takamoto, Chiba; Tetsujiro Omura, Kokubunji, all of (JP)

(73) Assignees: Kimoto Co., Ltd.; Izumi-Cosmo Co., Ltd., both of (JP)

( * ) Notice: Subject to any disclaimer, the term of this patent is extended or adjusted under 35 U.S.C. 154(b) by 0 days.

(21) Appl. No.: 09/582,860

(22) PCT Filed: Jan. 6, 1999

(86) PCT No.: PCT/JP99/00012

§ 371 (c)(1),
(2), (4) Date: Jul. 6, 2000

(87) PCT Pub. No.: WO99/35534

PCT Pub. Date: Jul. 15, 1999

(30) Foreign Application Priority Data

Jan. 7, 1998 (JP) ............................................. 10-001299

(51) Int. Cl.[7] .......................... G03B 21/56; G03B 21/60
(52) U.S. Cl. ........................ 359/449; 359/452; 359/443; 359/459
(58) Field of Search ................................ 359/449, 452, 359/443, 459

(56) References Cited

U.S. PATENT DOCUMENTS

| | | | | |
|---|---|---|---|---|
| 2,378,252 A | * | 6/1945 | Staehle et al. | 359/453 |
| RE28,634 E | * | 12/1975 | DePalma | 359/453 |
| 5,361,163 A | * | 11/1994 | Matsuda et al. | 359/452 |
| 5,456,967 A | * | 10/1995 | Nezu | 428/141 |
| 5,831,774 A | * | 11/1998 | Toshima et al. | 359/707 |
| 5,864,426 A | * | 1/1999 | Songer | 359/452 |
| 6,144,491 A | * | 11/2000 | Orikasa et al. | 359/452 |
| 6,233,095 B1 | * | 5/2001 | Niwa et al. | 359/443 |

* cited by examiner

Primary Examiner—Christopher Mahoney
Assistant Examiner—Magda Cruz
(74) Attorney, Agent, or Firm—Lorusso & Loud

(57) ABSTRACT

A reflection type screen having a high SG value, a wide view angle and an excellent color reproducibility of bright parts of projected image is provided. The reflection type screen comprises a substrate having a light reflecting property such as a white plastic film and a light diffusion layer 2 formed on the substrate, which contains a light diffusion agent and a pearl pigment dispersed in a binder resin. The pearl pigment is mica covered with titanium dioxide and has an optical characteristic reflecting blue component of light projected by a projector and transmitting light of a color complementary to blue. When PC images having many white parts or the like are projected on the screen, the bright part of the images does not become yellowish and projected images with high whiteness can be obtained. The content of pearl pigment is preferably 5–100 parts by weight based on 100 parts by weight of the binder resin and 10–150 parts by weight based on 100 parts by weight of the light diffusion agent.

9 Claims, 2 Drawing Sheets

(a)

(b)

(a)

(b)

REFLECTION TYPE SCREEN FOR PROJECTORS

BACKGROUND OF INVENTION

This invention relates to a reflection type screen for a projector on which images projected by a projector such as an OHP, slide projector, and film projector are displayed as reflected light. In particular, it relates to a reflection type screen for a projector suitable for projection of static images such as personal computer (abbreviated as PC, hereinafter) images etc.

Polarizing screens utilizing polarizing films or glass bead screens having retroreflection ability are used as high luminance screens capable of producing high contrast images even in a light room. However, polarizing screens and glass bead screens are problematic because of high cost, many manufacturing processes or difficulty in manufacturing, and narrow view angle. As a high luminance reflective screen with a wide view angle, a reflective screen provided with a reflective layer including aluminum paste or a pearl pigment has been proposed (Japanese Unexamined Patent Application Publication No.3-119334 (1991)).

In recent years, however, marked increases in the amount of light produced by liquid crystal projectors has made it possible to obtain high-contrast images in a light room without using a high luminance screen. Consequently, wider view angle has become more desired than luminance in the performance of the reflection type screen.

For improving view angle, there have been proposed projector screens with a reflective layer containing brilliant pigments such as aluminum pigments or a pearl pigment added with light diffusive agents such as mica powder or silicon oxide powder and thixotropic agents for preventing sedimentation of the brilliant pigments (Japanese Patent Unexamined Application Publication No.8-231904(1996)), and reflective screens having a reflective layer of aluminum paste in which resin beads of a specific refraction index are dispersed (Japanese Patent Unexamined Application Publication No.6-148746(1994)).

FIG. 2 shows a projector 20 which projects images displayed on a liquid crystal display of a PC 30 directly onto a reflective screen 10. Projectors of this type have come into common use in recent years. Generally, the characters of the PC image are displayed as dark parts against a bright main part (white field) of the PC image. Therefore, reflective screens for projecting such images are required to be capable of displaying the dark portions clearly and making bright part look "white".

However, since the projector 20 generally uses a metal halide lamp as a light source, when conventional screens are used, color reproducibility is bad, that is, the bright part becomes yellowish or light orange due to its low color temperature or the entire screen looks gray.

Therefore, an object of the present invention is to provide a reflection type screen capable of projecting clear static images such as PC images and having a wide view angle. In particular, the present invention aims at providing a reflection type screen excellent in color reproducibility of the bright part of static images.

DISCLOSURE OF INVENTION

The reflection type screen of the present invention comprises a substrate having a light reflecting property and a light diffusion layer formed thereon, wherein the light diffusion layer contains a pearl pigment and a light diffusion agent dispersed in a binder resin and the pearl pigment has an optical property of reflecting blue light and transmitting light of a color complementary to blue.

The content of the pearl pigments in the light diffusion layer is preferably in the range of 5–100 parts by weight, more preferably in the range of 10–50 parts by weight based on 100 parts by weight of the binder resin. The content of the pearl pigment is preferably in the range of 10–150 parts by weight, more preferably 30–110 parts by weight based on 100 parts by weight of the light diffusion agent. The content of the light diffusion agent is preferably in the range of 10–100 parts by weight, more preferably 20–50 parts by weight based on 100 parts by weight of the binder resin.

Of the light emitted by the light source, the pearl pigment dispersed in the light diffusion layer of this reflection type screen transmits only light having a wavelength of about 570–610 nm, and reflects other light (blue light). Part of the transmitted light is reflected at the surface of the substrate. As a result, yellowish color is suppressed in the bright part of images and this part looks white as a whole. Therefore, PC images having many white parts can be exhibited clearly. In addition, luminance is not degraded since light absorption of the screen is small. In particular, when the contents of the light diffusion agent and the pearl pigment are in appropriate ranges, a reflective screen having a wide view angle and a high screen gain (SG) value can be obtained.

BEST MODE FOR CARRYING OUT THE INVENTION

The reflection type screen for a projector of the present invention will be explained in detail hereinafter.

Figure 1:
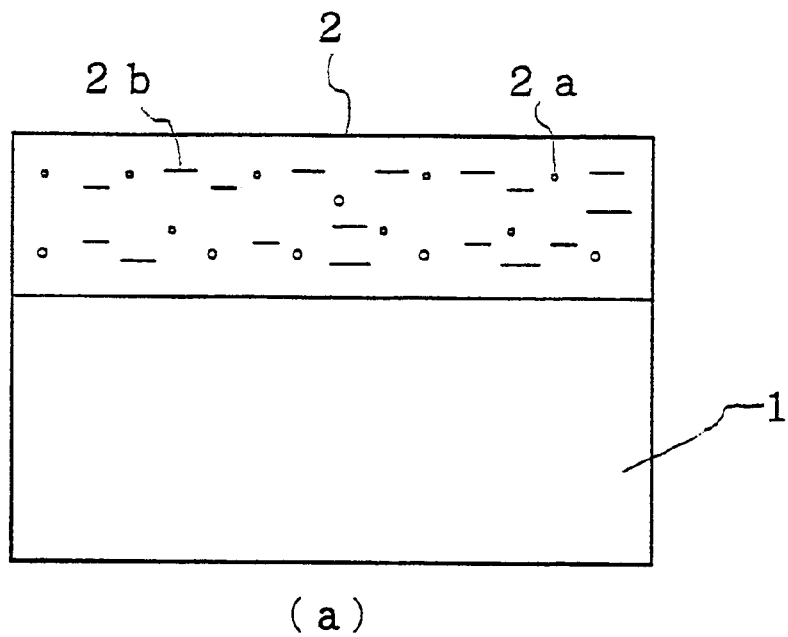
FIGS. 1(a) and 1(b) are cross sectional views of the reflection type screens that are embodiments of the present invention.
Figure 1:
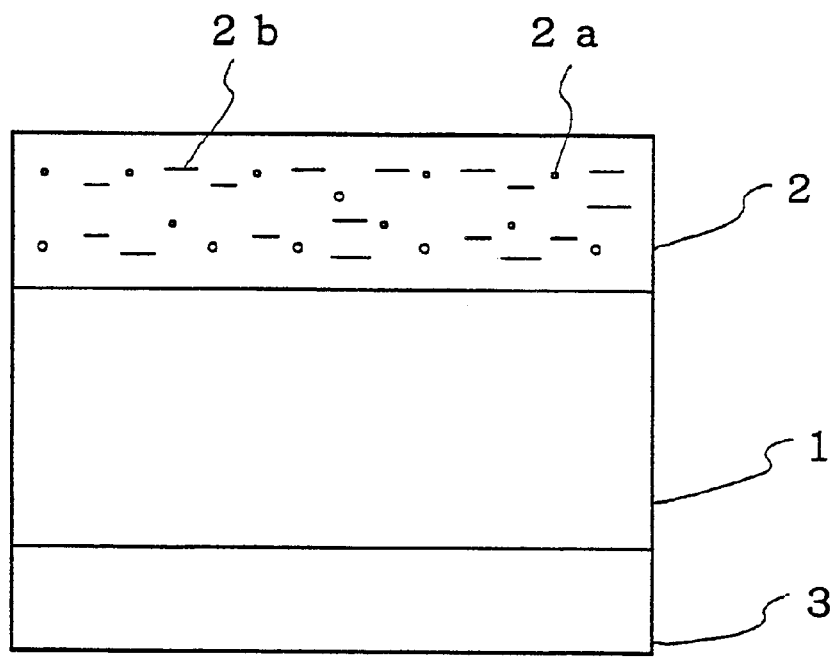
Figure 2:
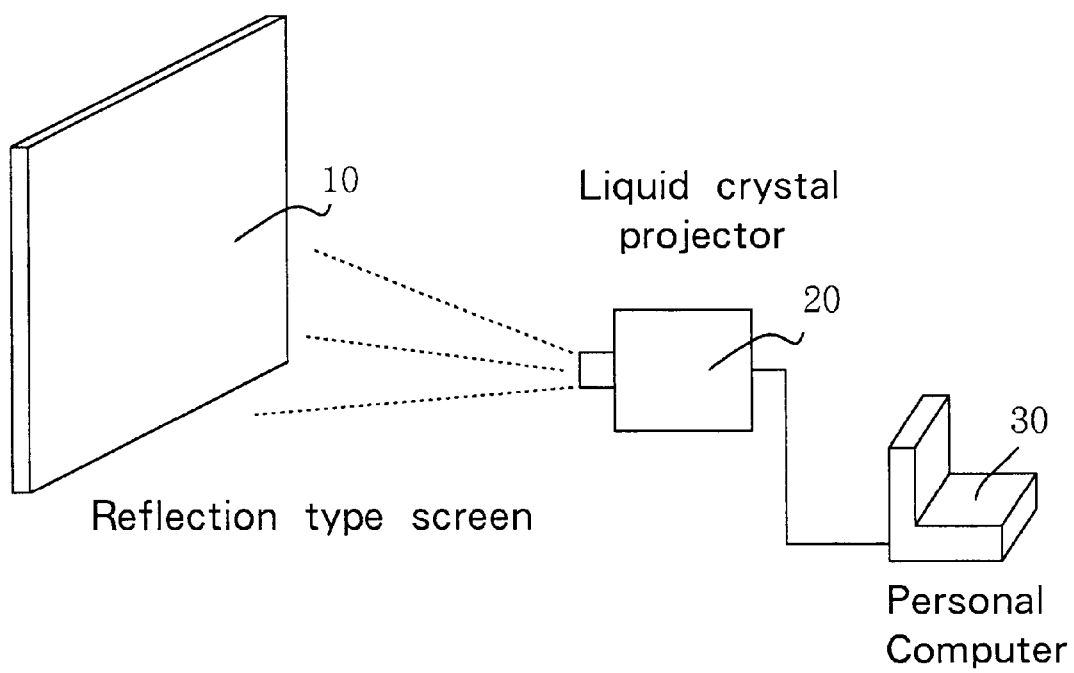
FIG. 2 is a diagram showing a liquid crystal projector using the reflection type screen of the present invention.

As shown in FIG. 1(a), the reflection type screen for a projector of the present invention comprises a substrate 1 having a light reflecting property and a light diffusion layer 2 formed on the substrate 1 as essential components.

As the substrate 1 having a light reflecting property, a film or sheet having a surface with reflectivity of 90% or more is employed. A plastic sheet having a surface deposited with a metal such as aluminum or having a reflective layer of aluminum paste or the like may be used as the substrate. However, a resin sheet in which white pigments are admixed is preferred in order to suppress generation of hot spots and to obtain a good reflection characteristic. Typical examples of the resin sheet include those of homopolymer or copolymer of (meth)acrylic acid esters such as methyl methacrylate and methyl acrylate, polyesters such as polyethylene terephthalate, polycarbonates, polyvinyl chloride, polystyrenes and the like.

Preferably, a light shielding layer 3 is provided on the opposite side of the substrate from the light diffusion layer 2, as shown in FIG. 1(b) to shield against exterior light. The light shielding layer 3 may be a black colored paper or a black film comprising a black pigment such as carbon black properly included in resin, and may be formed on the opposite side of the substrate 1 from the light diffusion layer 2 by coating or laminating.

The light diffusion layer 2 contains a binder resin, a light diffusion agent 2a, and a pearl pigment 2b. As the binder resin can be employed one or more resins selected from among vinyl acetate resins, denaturated vinyl acetate resins, copolymer resins of denaturated vinyl acetate/acrylate, ethylene/vinyl acetate resins, polyester resins, acrylic copolymer resins, acrylic silicone resins, cellulose resins, copolymer resins of vinyl chloride/vinyl acetate, styrene resins, urethane resins, epoxy resins, denaturated polyvinyl alcohol resins, acrylonitrile rubbers and the like.

The light diffusion agent 2a includes inorganic pigments such as silica, titanium oxide, calcium carbonate, barium sulfate, and resin beads such as acrylic beads, styrene beads, silicone beads, and urethane beads. Transparent resin beads are particularly preferable. By using the transparent resin beads, suitable light diffusion property can be imparted to the light diffusion layer without impairing the reflecting property of the pearl pigment. The resin beads preferably have a particle size of 2–25 μm. Spherical resin beads are particularly preferable. By using transparent resin beads with a particle size in this range, a wide view angle and a high SG value can be obtained.

The content of the light diffusion agent is preferably in the range of 10–100 parts by weight, more preferably in the range of 20–50 parts by weight based on 100 parts by weight of the binder resin. When the content is less than 10 parts by weight, a high SG can be obtained but a good view field characteristic cannot. When the content is more than 100 parts by weight, the SG value decreases because the relative content of the pearl pigment decreases.

The pearl pigment is generally mica (thin plate mica powder) covered with titanium dioxide. In the present invention, iridescence type (interference color type) pearl pigment, which transmits only light having a specific wavelength (in the approximated range of 570–610 nm) and reflects other light, is used. The titanium dioxide layer of this pearl pigment functions as an interference layer when the thickness (coating rate) of the titanium dioxide layer is 100–140 nm or an odd multiples thereof, and reflects blue light. Particle size of the pearl pigment 2b may be 5–200 μm, preferably 10–60 μm.

In the light diffusion layer containing such pearl pigment, the blue component of incident light is reflected by the pearl pigment and part of the yellow or orange component, which transmits through the pearl pigment, is reflected at the surface of the substrate. As a result, the color of the reflected light is shifted to the blue side without decreasing the amount of the reflected light. Images having a whiter bright part and clearer dark part (character part) can therefore be projected.

The content of the pearl pigment is preferably in the range of 5–100 parts by weight, more preferably in the range of 10–50 parts by weight based on 100 parts by weight of the binder resin. When the content is less than 5 parts by weight, the SG value and the color temperature are low. When the content is more than 100 parts by weight, the SG value and color temperature increase but adhesiveness of the light diffusion layer to the substrate decreases and the scratch resistance of surface of the light diffusion layer is impaired.

When the content of the pearl pigment relative to that of the light diffusion agent is large, the SG value increases but the view angle tends to decrease. When the content of the pearl pigment relative to that of the light diffusion agent is small, the SG value decreases. Accordingly, the content of the pearl pigment is preferably 10–150 parts by weight, more preferably 30–110 parts by weight based on 100 parts by weight of the light diffusion agent. In this range, a high SG value and a wide view angle can be obtained.

The light diffusion layer may be contain known additives such as ultraviolet ray absorbents and anti-static agents in addition to the above-mentioned light diffusion agent and pearl pigment.

The reflection type screen of this invention can be formed by applying a coating solution containing the above-mentioned binder resin, light diffusion agent, pearl pigment, required additives, and a suitable solvent on the substrate, and drying. The thickness of the light diffusion layer is not particularly limited but is generally about 3–20 μm. When a light shielding layer is to be provided on the substrate, a coating solution containing a binder resin, black colorant and suitable solvent is applied to the side of the substrate opposite from the light diffusion layer and dried. Otherwise, the light shielding layer may be formed by laminating a black film or paper onto the substrate.

The thus composed reflection type screen of this invention displays bright parts of a static image having many white field parts with higher whiteness, and displays the whole image finely and the character parts clearly.

EXAMPLES

Examples of the present invention will be explained hereinafter.

Example 1

A coating solution for the light diffusion layer having the following composition was applied to one side of a polyester film having a thickness of 100 μm (LUMIRROR E20: Toray Industries Inc.) using a bar-coater and dried to form a light diffusion layer. Thus, a reflection type screen was obtained.

| | |
|---|---|
| Polyester resin (Vyron 300: Toyobo Co., Ltd.) | 100 parts by weight |
| Styrene beads (6 μm) (SBX-6: Sekisui Chemical Co., Ltd.) | 30 parts by weight |
| Pearl pigment (Iriodin225: Merck Japan Co.; covering rate of titanium dioxide: 52%; reflected light: blue; transmitted light: orange) | 15 parts by weight |
| Ethyl acetate | 200 parts by weight |
| Butyl acetate | 200 parts by weight |

The SG value and view angle of this screen were measured. The SG value was obtained from luminance of the screen surface and illuminance of the light source using the equation SG=(B/E)×π (where B represents luminance of the screen surface ($cd/m^2$=nit) and E represents illuminance ($lm/m^2$=lux)). The view angle was obtained by measuring luminance of the screen every 10° of screen surface angle relative to a fixed luminance meter while varying the angle from 0°–50°, and by finding the angle (half value angle) where the luminance was 50 based on the luminance at the front (0°) defined as 100.

In addition, the color temperature was measured as an index of the color reproducibility in the white part of the screen. The color temperature was measured according to the measurement method of JIS Z8725. The measurement results of the SG value, half value angle, and color temperature are shown in Table 1.

Examples 2–6

Comparative Example 1

Reflection type screens were produced in the same manner as that of Example 1 except that the content of the pearl pigment was changed as shown in Table 1. SG value, half value angle and color temperature were measured for these reflection type screens in the same manner as that of Example 1. The results are also shown in Table 1.

Comparative Example 2

A reflection type screen was produced in the same manner as that of Example 1 except that another pearl pigment having a different covering rate of titanium dioxide (Iriodin215; reflected light: red purple; transmitted light:

yellow; Covering rate of titanium dioxide: 47%; Merck Japan Co.) was used. SG value, half value angle and color temperature were measured for this reflection type screen in the same manner as that of Example 1. The results are also shown in Table 1.

Comparative Examples 3, 4

Reflection type screens were produced in the same manner as that of Example 1 except that aluminum paste (5501EA: Showa Alum-Powder Co.; Comparative example 3) and blue pigment (Milori Blue671: Dainichiseika Kogyo; Comparative example 4) were used instead of pearl pigment. SG value, half value angle and color temperature were measured for these reflection type screens in the same manner as that of Example 1. The results are also shown in Table 1.

Example 7

A reflection type screen was produced in the same manner as that of Example 1 except that silicone resin beads (Tospearl130: GE Toshiba Silicones Co., Ltd.) were used as the light diffusion agent instead of styrene beads. SG value, half value angle and color temperature were measured for this reflection type screen in the same manner as that of Example 1. The results are also shown in Table 1.

Example 8

A reflection type screen was produced in the same manner as that of Example 1 except that 20 parts by weight of titanium dioxide (inorganic pigment) was used as the light diffusion agent instead of 30 parts by weight of styrene beads. SG value, half value angle and color temperature were measured for this reflection type screen in the same manner as that of Example 1. The results are also shown in Table 1.

TABLE 1

| | Light diffusion agent | Pearl pigment | Other pigment | SG value | Half value angle | Color temperature |
|---|---|---|---|---|---|---|
| Example 1 | 30 | 15 | — | 2.0 | 45° | 7000 |
| Example 2 | 30 | 30 | — | 2.2 | 40° | 7200 |
| Example 3 | 30 | 60 | — | 2.5 | 25° | 7500 |
| Example 4 | 30 | 5 | — | 1.5 | 60° | 6500 |
| Example 5 | 60 | 15 | — | 1.0 | 75° | 6000 |
| Example 6 | 10 | 15 | — | 2.8 | 15° | 7600 |
| Example 7 | 30*** | 15 | — | 2.0 | 45° | 7000 |
| Example 8 | 20** | 15 | — | 1.9 | 45° | 6800 |
| Comp. Exam. 1 | 30 | — | — | 2.0 | 45° | 5600 |
| Comp. Exam. 2 | 30 | 15* | — | 2.0 | 45° | 5200 |
| Comp. Exam. 3 | 30 | — | 15 (Al) | 2.0 | 35° | 5800 |
| Comp. Exam. 4 | 30 | — | 15 (blue) | 0.9 | 55° | 8200 |

*pearl pigment having a different covering rate
**titanium dioxide
***different kind of light diffusion agent As will be understood from the results shown in Table 1, the color temperature was improved by adding a pearl pigment to the light diffusion layer. However, when the content of the pearl pigment relative to that of the resin beads was large (Examples 3 and 6), the view angle showed a tendency to decrease. When the content of the pearl pigment relative, to that of the resin beads was small (Examples 4 and 5), a high SG value could not be obtained. When the pearl pigment content relative to that of the resin beads was in an appropriate range (Examples 1, 2 and 7), screens having a wide view angle and a high SG value were obtained. When an inorganic pigment was used instead of the resin beads (Example 8), a screen having the same characteristics was obtained.

On the other hand, the screen containing no pearl pigment in the light diffusion layer showed low color temperature, and the bright part of images projected thereon had a markedly yellowish color attributable to the projector light source. The screen in which another pearl pigment having a different covering rate of titanium dioxide was used as a pearl pigment (Comparative example 2) showed low color temperature and a white image projected thereon became reddish.

The screen using aluminum paste instead of pearl pigment (Comparative example 3) showed grayish color attributable to aluminum and low color temperature. When blue pigment was used instead of the pearl pigment (Comparative example 4), white image became blue because of very high color temperature, the SG value was very low and images were not clear as a whole.

INDUSTRIAL APPLICABILITY

As clearly shown in the above examples, the reflection type screen of this invention achieves a practicable SG value and a wide view angle by adding pearl pigment having a specific optical property to the light diffusion layer, and is capable of displaying projected images having a high color temperature in the bright part. Thus, the present invention can provide a reflection type screen suitable for projecting static images having many white parts such as PC images.

What is claimed is:

1. A reflection type screen for a projector comprising a substrate having a light reflecting property and a light diffusion layer formed on the substrate, wherein the light diffusion layer is a single layer formed from a single coating solution containing a pearl pigment and a light diffusion agent, both dispersed in a common binder resin and wherein the pearl pigment has an optical characteristic reflecting blue light and transmitting light of a color complementary to blue.

2. A reflection type screen for a projector of claim 1, wherein the pearl pigment is mica covered with titanium dioxide.

3. A reflection type screen for a projector of claim 1, wherein the light diffusion agent is transparent resin beads.

4. A reflection type screen for a projector of claim 1, wherein the light diffusion layer contains the pearl pigment in an amount of 5–100 parts by weight based on 100 parts by weight of the binder resin.

5. A reflection type screen for a projector of claim 1, wherein the light diffusion layer contains the light diffusion agent in an amount of 10–100 parts by weight based on 100 parts by weight of the binder resin.

6. A reflection type screen for a projector of claim 1, wherein the light diffusion layer contains the pearl pigment in an amount of 10–150 parts by weight based on 100 parts by weight of the light diffusion agent.

7. A reflection type screen for a projector of claim 1, wherein the substrate having a light reflecting property is a white plastic film.

8. A reflection type screen for a projector of claim 1, wherein the substrate is provided with a light shielding layer on a side opposite the light diffusion layer.

9. A reflection screen for a projector of claim 1, wherein said light diffusion layer forms an outer surface of said screen.

* * * * *